United States Patent [19]
Ennis

[11] Patent Number: 5,930,859
[45] Date of Patent: Aug. 3, 1999

[54] VEHICLE WASHING APPARATUS WITH MOVABLE BRUSH ARM PIVOT POINT

[76] Inventor: G. Thomas Ennis, 235 W. Florence Ave., Inglewood, Calif. 90301

[21] Appl. No.: 08/987,378

[22] Filed: Dec. 9, 1997

[51] Int. Cl.⁶ ........................................................ B60S 3/06
[52] U.S. Cl. .......................................... 15/53.3; 15/DIG. 2
[58] Field of Search ..................... 15/53.1, 53.2, 15/53.3, 97.3, DIG. 2

[56] References Cited

U.S. PATENT DOCUMENTS

| | | |
|---|---|---|
| 3,471,883 | 10/1969 | Ennis . |
| 3,559,225 | 2/1971 | Ennis . |
| 3,601,833 | 8/1971 | Takeuchi . |
| 3,633,231 | 1/1972 | Capra . |
| 3,662,419 | 5/1972 | Dini . |
| 3,720,972 | 3/1973 | Ennis . |
| 3,852,842 | 12/1974 | Weigele et al. . |
| 4,024,598 | 5/1977 | Miner . |
| 4,194,923 | 3/1980 | Johnson ............................... 15/DIG. 2 |
| 4,225,995 | 10/1980 | Ennis . |
| 4,299,003 | 11/1981 | Ennis . |
| 4,769,868 | 9/1988 | Pagnanelli et al. . |
| 5,077,859 | 1/1992 | Ennis . |
| 5,279,013 | 1/1994 | Krichbaum . |
| 5,715,558 | 2/1998 | Johnson ............................... 15/DIG. 2 |

*Primary Examiner*—Terrence R. Till
*Attorney, Agent, or Firm*—Fay, Sharpe, Beall, Fagan, Minnich & McKee

[57] ABSTRACT

A vehicle washing apparatus includes a supporting frame extending over a path of a vehicle to be washed and a rotary brush assembly attached to a brush support arm pivotably connected to a moveable support mechanism directly mounted on the frame for lateral movement with respect to the path of the vehicle. The supporting frame includes a pair of spaced upper members supported on each end by legs having spaced side members.

21 Claims, 8 Drawing Sheets

FIG. 7I

VEHICLE WASHING APPARATUS WITH MOVABLE BRUSH ARM PIVOT POINT

BACKGROUND OF THE INVENTION

1. Field of the Invention

The present invention relates to an improved vehicle washing apparatus and, more particularly, to such an apparatus having a movable support mechanism for pivotally supporting a brush support arm for a rotary brush whereby the support arm and brush are movable with the movable support mechanism.

2. Description of the Prior Art

Numerous devices are known in the art for washing vehicles by employing rotating brush assemblies for cleaning one or more of the front, sides and back of a vehicle. Many of these prior art devices are relatively complicated in construction and require the use of extensive power control systems to effect the proper movement of the brush assembly to effectively clean the vehicle. For example, in wrap-around rotating brush assemblies, hydraulic power control systems are often used to move the brush assemblies along the front, side and back of the vehicle. Such hydraulic power control systems require close supervision and extensive maintenance and adjustment in order to operate properly. Consequently, these types of devices are expensive to construct, operate and maintain.

Other such prior art devices use an articulated arm to support a rotary brush. See, for example, the devices shown in my prior U.S. Pat. Nos. 3,471,883 issued Oct. 14, 1969 and 3,720,972 issued Mar. 20, 1993. While such devices are generally satisfactory, they nevertheless are relatively more complicated in construction.

Other prior art devices, such as that shown in my prior U.S. Pat. No. 4,225,995 issued Oct. 7, 1980 employ a single arm for mounting a rotary brush with the arm being pivoted at a stationary point on the frame of the device. While such devices also have been generally satisfactory, particularly when employing a flexible coupling between the drive means for the brush and a shaft upon which the brush is mounted, as also disclosed in U.S. Pat. No. 4,225,995, such devices do not always adequately wash the front and rear of the vehicle and at times can get hung up on mirrors on the sides of the vehicle.

SUMMARY OF THE INVENTION

It is an object of the present invention to provide a vehicle washing apparatus which avoids the disadvantages of the prior art discussed above by providing a vehicle washing apparatus having a movable support mechanism mounted on a frame and having a brush support arm for supporting a rotary brush pivotally attached to the movable support mechanism for movement therewith whereby the movable support mechanism provides a movable main brush pivot point.

A further object of the invention is to provide a vehicle washing apparatus having a movable brush arm support mechanism which provides a movable main brush pivot point whereby movement of the pivot point increases the dwell time of a brush on the front and rear of a vehicle.

Another object of the invention is to provide a vehicle washing apparatus having a movable brush arm support mechanism which is slidable laterally of a frame and which is capable of rotation in a plane perpendicular to the top of the frame.

A still further object of the present invention is to provide a vehicle washing apparatus having a brush arm mounted on a movable support mechanism whereby the brush arm is pivotable through an arc of approximately 180°.

Still another object of the present invention is to provide a vehicle washing apparatus which is capable of mounting a rotary brush whereby the brush may effectively wash a vehicle without getting hung up on side mirrors and which more adequately washes the front and rear of a vehicle.

A further object of the present invention is to provide an improved frame structure for a vehicle washing apparatus which provides a stable mounting for cleaning devices attached thereto.

The present invention achieves the above and other objects by providing a vehicle washing apparatus having a supporting frame extending over a path of a vehicle to be washed and having a rotary brush attached at one end of a single brush support arm. A movable brush arm support mechanism is directly mounted overhead on the frame for lateral movement with respect to the path of the vehicle to be washed and having a brush support arm pivotally mounted thereto. A track may be mounted overhead on the frame whereby the movable brush arm support mechanism is movable along the track. The movable brush arm support mechanism may be mounted on the track so that the mechanism may pivot in a plane perpendicular to the track. The brush support arm is mounted to the movable brush arm support mechanism whereby the brush arm may pivot in an arc of approximately 180°. The rotary brush also may be connected to a drive motor through flexible coupling means. The vehicle washing apparatus may include a pair of rotating brush assemblies mounted on a frame with the brush arm of one assembly being longer than the brush arm of the other assembly.

The apparatus further includes an improved frame having first and second upper members spaced from each other with the second upper member being shorter in length than the first upper member and having the two upper members connected together by spaced intermediate upper members. The frame further includes a leg on each side for supporting the first and second upper members. Each leg includes an outer side member, an inner side member spaced from the other side member and shorter in length than the outer side member and spaced intermediate side members connecting the outer and inner side members together. The outer side member of each leg is connected to and supports an end of the longer, first upper member and the inner side member of each leg is connected to and supports an end of the shorter, second upper member. The members of the frame may be comprised of rectangular tubes.

These and other features and advantages of the vehicle washing apparatus of the present invention will become more apparent with reference to the following detailed description and drawings.

DETAILED DESCRIPTION OF THE PREFERRED EMBODIMENTS

Referring to the drawings, a vehicle washing apparatus, generally referred to by the numeral 10, is shown which includes a supporting frame 12 extending over a path 13 of a vehicle to be washed. The overhead frame 12 preferably has a first pair of wrap around rotary brushes 14 and 16 mounted adjacent the front and thereof and a second pair of wrap around rotary brushes 18 and 20 pivotally mounted to the rear of the frame. Although a pair of brushes are shown in each instance, only a single brush could also be used. A top scrubber curtain device 24 also may be mounted at the front of the frame for reciprocal movement by a motor mechanism 25.

Figure 1:
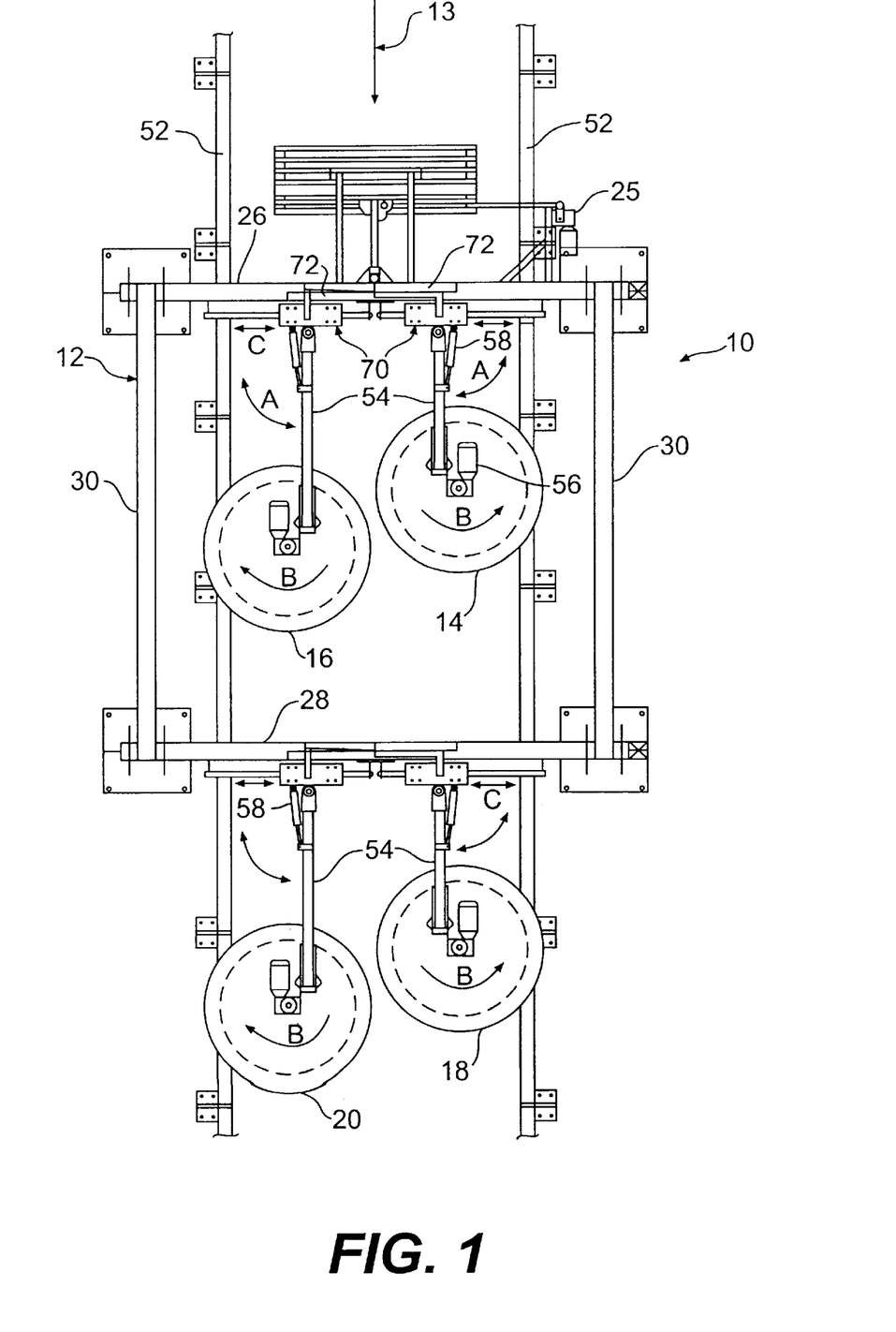
FIG. 1 is a top plan view of a vehicle washing apparatus according to the present invention.
Figure 2:
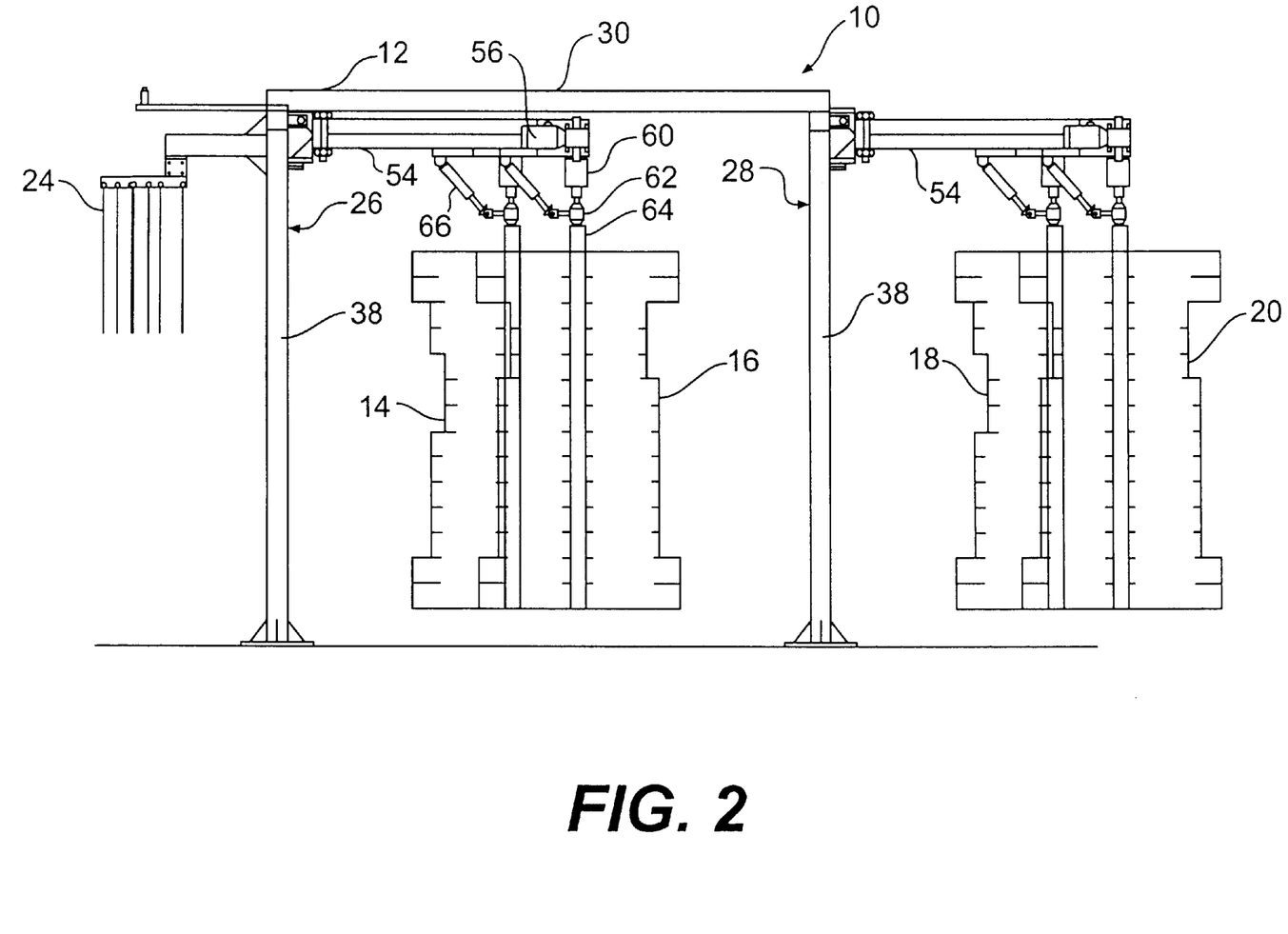
FIG. 2 is a side elevational view of the vehicle washing apparatus shown in FIG. 1.
Figure 3:
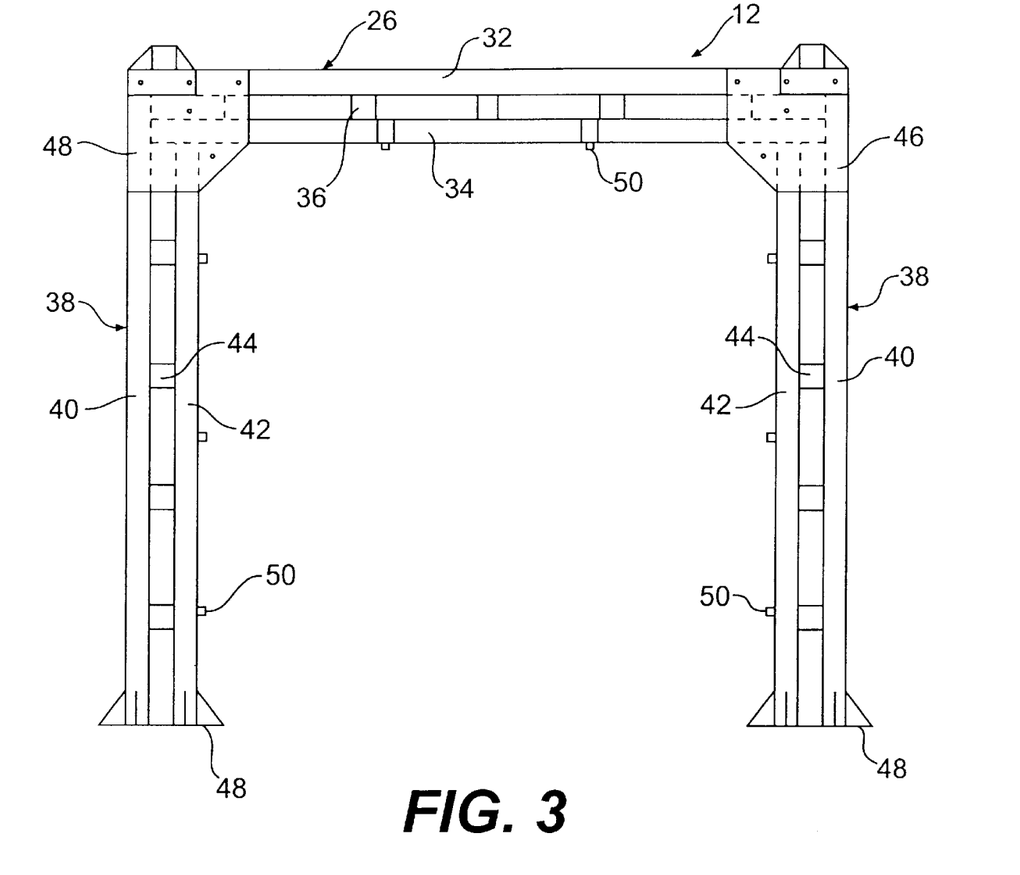
FIG. 3 is a front elevational view of a section of the frame of the vehicle washing apparatus.

As shown in FIGS. 1–3, the frame 12 is comprised of a front section 26 for mounting the first pair of rotary brushes 14 and 16 and a back section 28 for mounting the second pair of rotary brushes 18 and 20. The front and back sections 26 and 28 are connected at the top ends thereof by side arms or beams 30. While FIGS. 1 and 2 show the front section and back section of the frame connected together, each section is also capable of being used standing alone.

Figure 4:
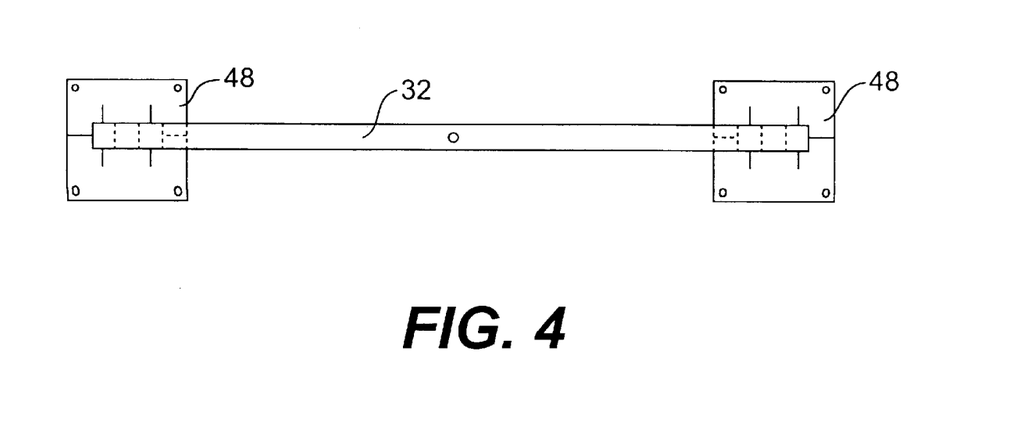
FIG. 4 is a top view of the frame section shown in FIG. 3.

As shown in greater detail in FIGS. 3 and 4, the front section 26 includes a first upper member 32, a second upper member 34 spaced from and below said first upper member and being shorter in length then the first upper member and spaced intermediate upper members 36 connecting the first and second upper members. The front section 26 further includes a leg 38 on each side thereof for supporting the first and second upper members. Each leg 38 is comprised of an outer side member 40, an inner side member 42 spaced from and shorter in length than the outer side member and spaced intermediate side members 44 connecting the outer and inner side members. Each leg outer side member 40 supports an end of a first upper member 32 and each inner side member 42 supports an end of a second upper member 34. The intermediate side connecting members 44 form a stepladder type structure with outer side leg member 40 and inner side leg member 42. As shown in FIG. 3, the upper members 32 and 34 and the side leg members 40 and 42 are further connected at the top by a reinforcing plate 46. Moreover, each leg 38 is supported on the bottom by a bottom support plate 48. The bottom support plate members 48 may be securely fastened to a hard surface upon which they rest. Back frame section 28 is constructed in the same fashion as front frame section 26. Nozzles 50 are provided along the inside of each frame section to dispense liquids used in the washing process.

As shown in FIG. 1, guide rails 52 may be provided under the vehicle washing apparatus 10 to guide vehicles therethrough. Instead of guide rails, other suitable means for guiding a vehicle through the washing apparatus may be used such as tracks or mechanical conveying mechanisms.

Each of the rotary brushes 14, 16, 18 and 20 are part of a rotary brush assembly pivotally connected to a movable brush arm support mechanism directly mounted overhead on the frame as will be described in greater detail hereafter. Since each of the rotary brush assemblies are the same, only one will be described in detail with reference to FIGS. 1 and 2.

Each rotary brush is rotatably mounted to an end of a brush support arm 54. Each brush support arm 54 is rotatable in a horizontal plane across the path of a vehicle to be washed, as shown by the arrows A adjacent the brush support arms in FIG. 1. A motor 56 is mounted at the brush end of each support arm for rotating each of the wrap around brushes in the direction of the arrows B shown in FIG. 1. Brushes 14 and 18 rotate in a counterclockwise direction while brushes 16 and 20 rotate in a clockwise direction. The direction of rotation is such as to cause the brushes to walk or propel themselves around a vehicle being washed. The horizontal pivoting movement of each brush support arm 54 may be controlled by an air cylinder 58 attached between the inner end of each support arm and a movable brush arm support mechanism 70 mounting the support arm to the frame. The air cylinder 58 is mounted so as to not interfere with the approximately 180° pivotal movement of the support arm Each rotary brush is connected to a motor 56 through appropriate drive means 60 and a flexible coupling 62 between the drive means and a shaft 64 upon which the brush is mounted. Flexing or tilting of the brush may be controlled by suitable means such as an air cylinder 66 attached between a brush arm and either flexible coupling or shaft 64. The flexible coupling may be of the type disclosed in my prior U.S. Pat. No. 4,225,995 issued Oct. 7, 1980, which is incorporated herein by reference.

Figure 5:
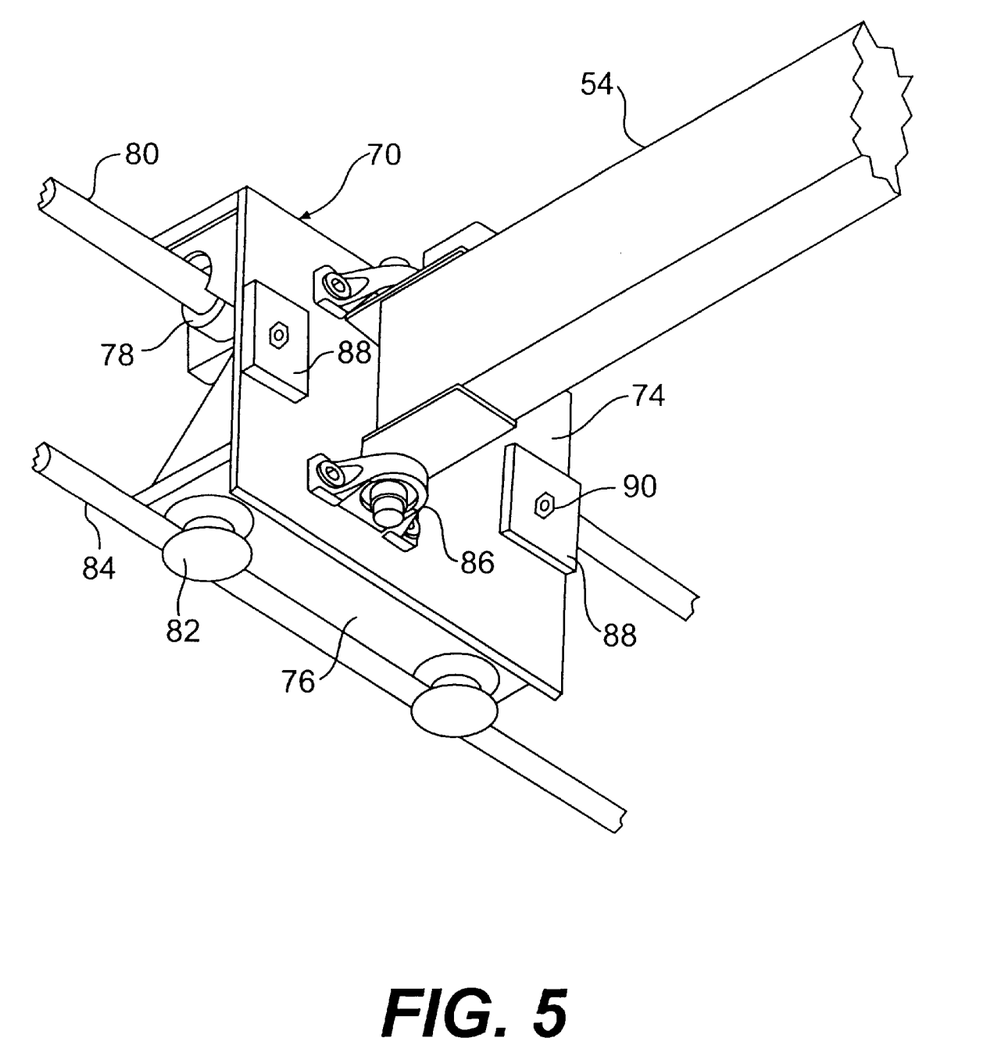
FIG. 5 is an enlarged perspective view of a movable brush arm support mechanism pivotally supporting a brush arm of the present invention.
Figure 6:
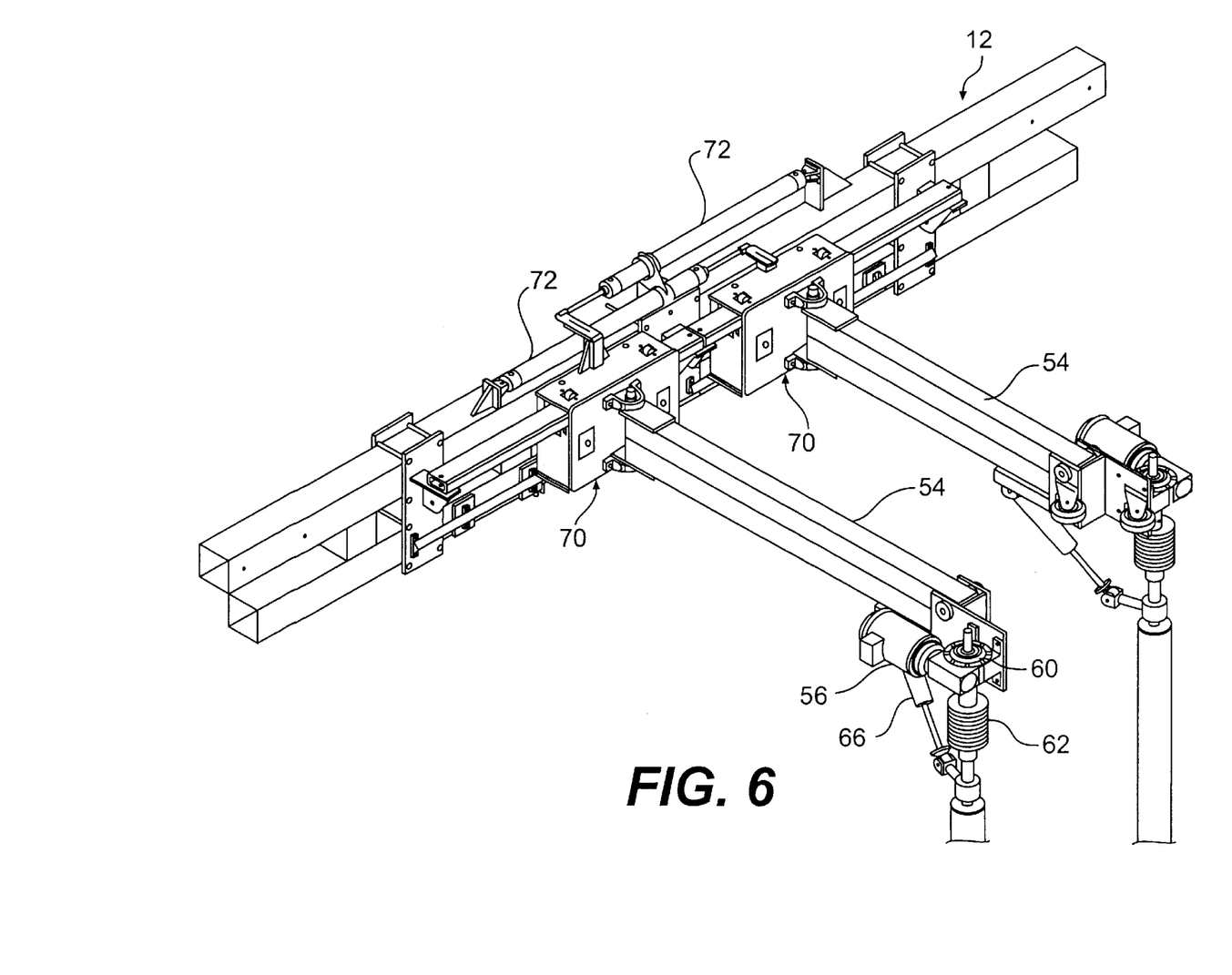
FIG. 6 is an enlarged perspective view showing a pair of movable brush arm support mechanisms of another embodiment of the present invention.

As most clearly shown in FIGS. 1, 5 and 6, the brush support arm 54 of each rotary brush assembly is pivotally mounted at its inner end to a movable brush arm support mechanism, generally indicated by the numeral 70. The movable support mechanism 70 is mounted for sliding movement along the top of the frame in a direction transversely of the path of a vehicle to be washed. As indicated by the arrows C in FIG. 1, each movable brush arm support mechanism is movable back and forth with the movement being regulated or controlled by an air cylinder 72 attached at one end to the frame and at an opposite end to a movable support mechanism 70. Any other suitable mechanical means for controlling movement of the movable brush arm support mechanism 70 such as a chain or cable means, a linear drive means, or a motor drive means. A gravity operated means could also be used.

As most clearly shown in FIG. 5, each movable brush arm support mechanism 70 is comprised of a front plate 74 and top and bottom plates 76. One or more linear bearings 78 are mounted on the back of the movable support mechanism whereby the movable support mechanism 70 may be mounted on a track in the form of a cylindrical rod 80 attached to the upper part of the frame 12. One or more grooved rollers 82 are mounted on the bottom of the movable support member for rolling engagement with a lower cylindrical rod 84 also mounted to the top of the frame 12 and forming part of the track. Linear bearing 78 permits linear movement of a movable support mechanism along the rod 80 as well as rotational movement in a plane perpendicular to the rod 80. Rotational movement of the movable mechanism 70 is also enhanced by the fact that grooved rollers 82 are only loosely engaged with rod 84 so that the movable mechanism is free to rotate away from the rod 84. Suitable pivot means 86 are mounted on the front surface of plate 74 for pivotally mounting a brush support arm 54 thereto. The pivot means may take the form of brackets and pins as shown in FIG. 5. The movable brush arm support mechanism 70 provides a movable main brush pivot point whereby the movement of the pivot point increases the dwell time of a brush on the front and rear of a vehicle as a result of the change in the rotational path of the brush.

Suitable stop members or bumpers, such as rubber pads 88, are mounted on the surface of plate 74 on either side thereof to stop pivotal movement of arm 54 at the ends of its swinging pivotal movement. With this construction, arm 54 is capable of rotating through an arc of approximately 180°. The rubber pads 88 may be mounted by suitable fastening means 90 which permit the pads to be adjustable.

FIG. 6 shows another embodiment of the invention in which the movable brush arm support mechanisms 70 are movable along a rectangular bar 92 which forms a track for the movable support mechanisms.

The operation of the vehicle washing apparatus of the present invention will now be described with reference to FIGS. 7A–7I.

Figure 7A:
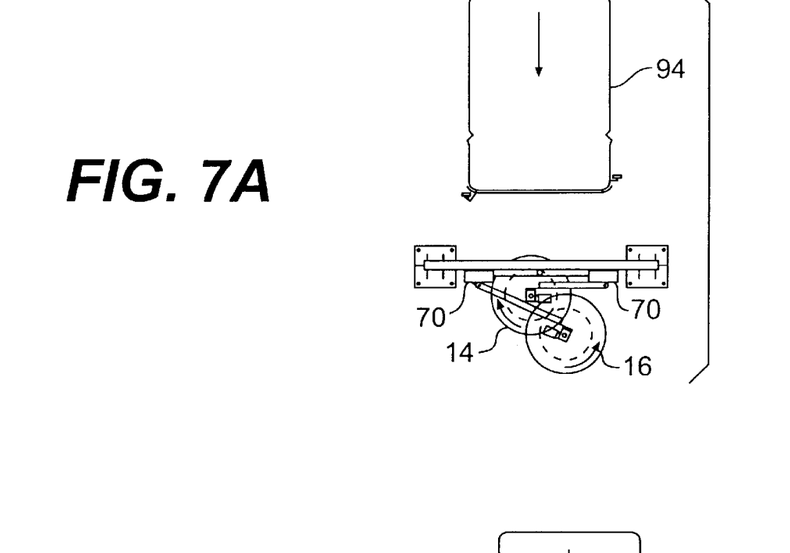
FIGS. 7A–7I are top plan views illustrating various positions of the brush assemblies as a vehicle passes through the vehicle washing apparatus of present invention.
Figure 7B:
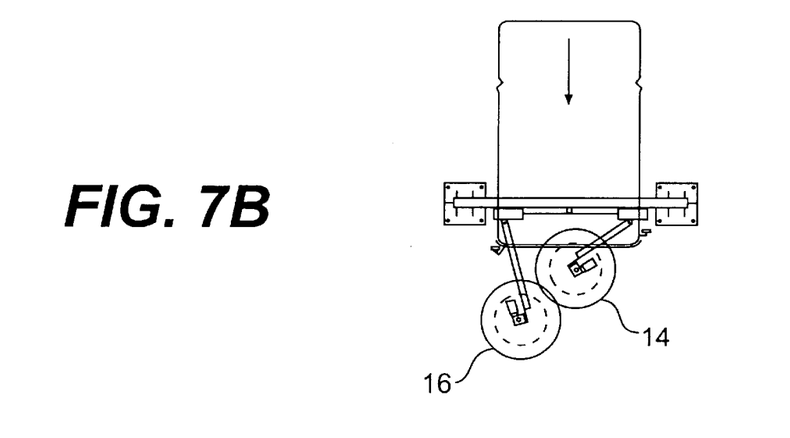
Figure 7C:
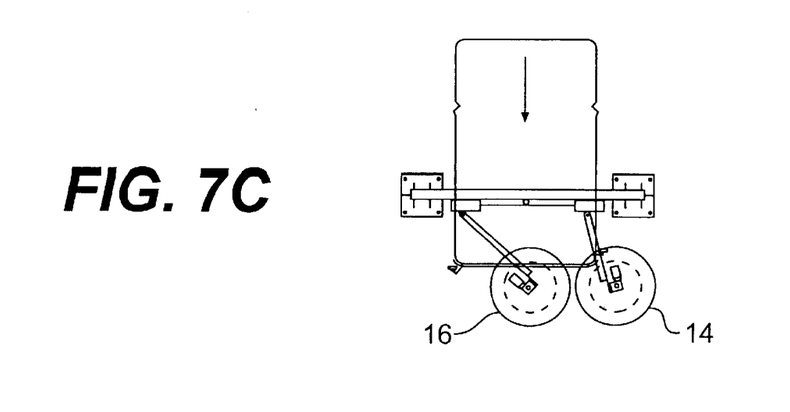
Figure 7D:
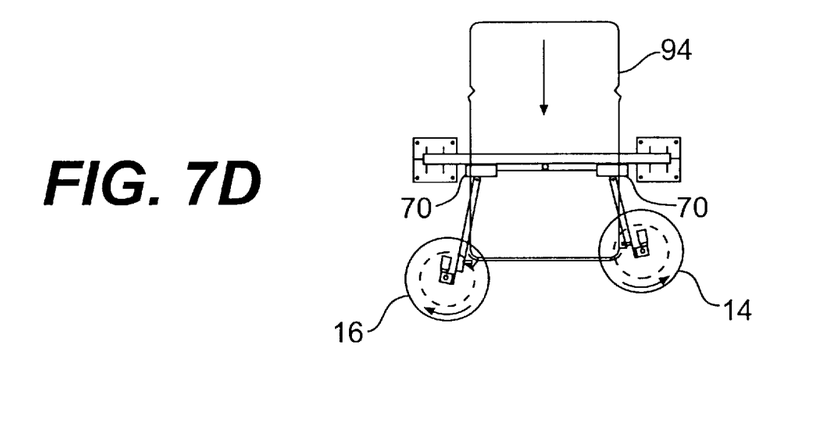
Figure 7E:
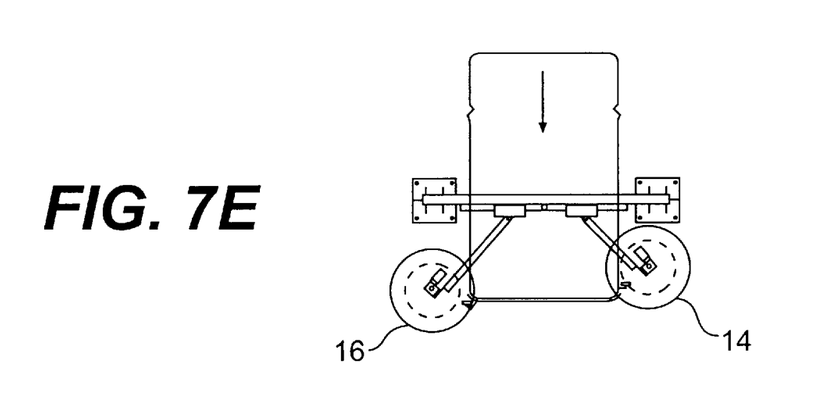
Figure 7F:
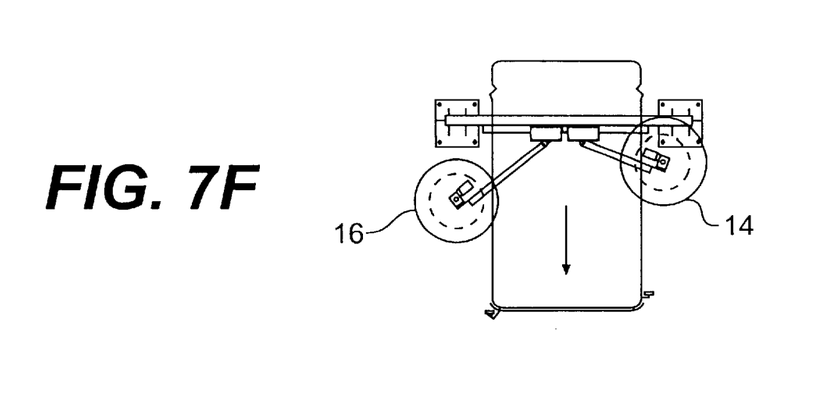
Figure 7G:
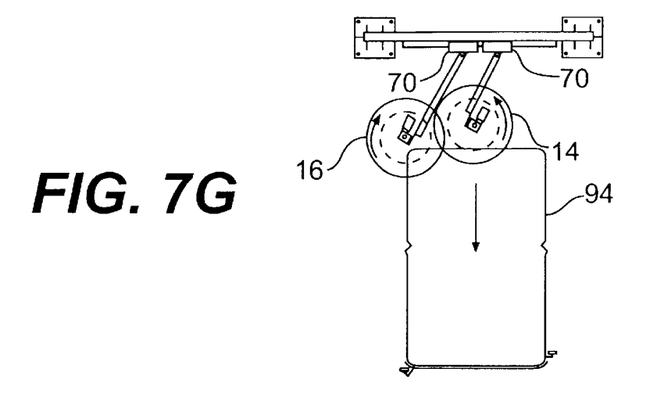
Figure 7H:
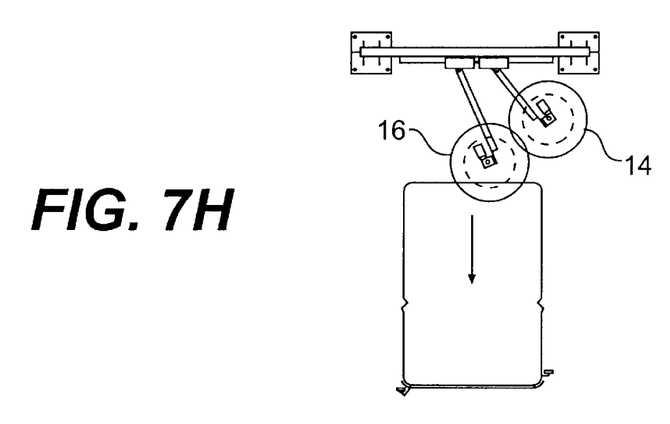
Figure 7I:
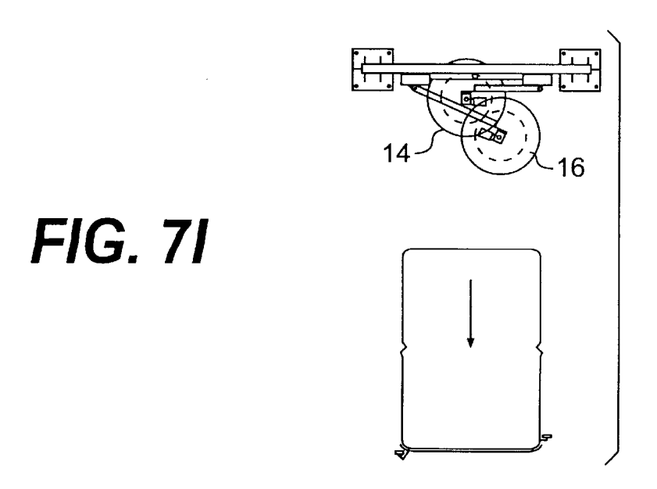

As shown in FIG. 7A, the brushes 14 and 16 initially are in a closed position whereby the brushes are generally in the center of the path of a vehicle 94 to be washed and the movable support mechanisms 70 are adjacent to the outside of the path of a vehicle to be washed. The brush support arm for the brush 16 is longer than the brush support arm for the brush 14 so that the brushes overlap on each side of the center of the path of a vehicle to be washed. As shown in FIG. 7B, as the vehicle 94 contacts the first brush 14, the brush 14 begins to move to the right across the front of the vehicle and brush 16 is pivoted outwardly away from the front of the vehicle. As the vehicle continues to move through the washing apparatus, as shown in FIG. 7C, as brush 14 moves around the front right side of the vehicle, brush 16 comes in contact with the front of the vehicle and begins to move across the front to the left corner of the vehicle. As both brushes begin to move, the movable mechanisms 70 begin to move towards the center of the path of travel of the vehicles. As the vehicle continues through the washing apparatus, both brushes round the rear corners of the vehicle and go across the back thereof as shown in FIGS. 7G and 7H. When the vehicle has completed its passage through the washing device, the brushes 14 and 16 return to their original positions in the center of the vehicle path as shown in FIG. 7I and the movable support mechanisms return to their original positions adjacent the outside of the vehicle path.

The construction of the present invention afford several advantages. Because the movable support mechanisms to which the brush support arms are pivotally mounted permit movement overhead transversely of the path of a vehicle, the washing operation may start by having the pivot point of each brush to the outside of the path of travel of the vehicle and the brush toward the center. This permits the longest radius of the arc of the arm upon which the brush is mounted to do the front end of the vehicle, giving each brush more cleaning power and dwell time at the front of the vehicle. As the brush moves to the side of the vehicle, the pivot point will be moved to the center of the vehicle path. Movement of the pivot point causes a change in the rotational path of the brush for more effective cleaning. This movement also allows the same full arc to go across the rear of the vehicle. This also gives the brush more cleaning power and dwell time at the rear of the vehicle.

In the first embodiment of the invention using the linear bearings to mount the movable support mechanism for the brush support arms on a cylindrical rod, the support mechanism may not only move linearly, but also has the ability to swing or move upwardly if a vehicle or other obstacle should hit it, since the whole brush arm is able to rotate on the linear bearings in an upward arc. Moreover, when the movable support mechanism which has been rotated upwardly, comes down, the grooved rollers on the bottom of the movable support mechanism ride on the lower cylindrical bar to provide a steady rest and to maintain the brush at a proper height and alignment.

The unique construction of the frame of the present invention also permits the brush assemblies to have a secure mounting and provides greater stability for the cleaning devices mounted on the frame.

Numerous other modifications and adaptations of the present invention will be apparent to those skilled in the art and thus, it is intended by the following claims to cover all such modifications and adaptations which fall within the true spirit and scope of the invention.

I claim:

1. A vehicle washing apparatus comprising:
   a supporting frame extending over a path of a vehicle to be washed;
   a rotary brush;
   a brush support arm;
   means rotatably mounting said brush at a first end of said brush support arm;
   a movable brush arm support mechanism directly mounted on said frame for lateral movement with respect to said path along said frame; and
   pivot means for pivotally mounting a second end of said brush support arm to said movable brush arm support mechanism.

2. A vehicle washing apparatus according to claim 1 wherein said movable brush arm support mechanism comprises a slidable plate mechanism.

3. A vehicle washing apparatus according to claim 1 wherein said movable brush arm support mechanism has stop means for said brush support arm mounted thereon, said stop means being positioned to permit said brush arm to pivot in an arc of approximately 180°.

4. A vehicle washing apparatus according to claim 1 which further includes a track mounted overhead on said frame and wherein said movable brush arm support mechanism is mounted on said track for movement thereon.

5. A vehicle washing apparatus according to claim 4 wherein said track comprises a rectangular bar.

6. A vehicle washing apparatus according to claim 4 wherein said track includes a first cylindrical rod and said movable brush arm support mechanism includes a linear bearing for mounting said movable brush arm support mechanism on said first cylindrical rod whereby said movable brush arm support mechanism is movable linearly along said first cylindrical rod and also is rotatable on said first cylindrical rod in a plane perpendicular to said first cylindrical rod.

7. A vehicle washing apparatus according to claim 6 wherein said track further includes a second cylindrical rod spaced from said first cylindrical rod and said movable brush arm support mechanism includes a grooved roller adapted to ride on said second cylindrical rod.

8. A vehicle washing apparatus according to claim 1 which further includes control means connected between said frame and said movable support mechanism to control movement of said movable brush arm support mechanism.

9. A vehicle washing apparatus according to claim 8 wherein said control means comprises an air cylinder.

10. A vehicle washing apparatus according to claim 1 wherein said means rotatably mounting said brush includes flexible coupling means.

11. A vehicle washing apparatus comprising:
    a supporting frame means extending over a path of a vehicle to be washed;

a pair of brush assemblies mounted on said frame means, each of said brush assemblies comprising:

a rotary brush;

a brush support arm;

means rotatably mounting said brush at a first end of said brush support arm;

a movable brush arm support mechanism directly mounted on said frame for lateral movement with respect to said path along said frame; and pivot means for pivotally mounting a second end of said brush support arm to said movable brush arm support mechanism.

12. A vehicle washing apparatus according to claim 11 wherein said movable brush arm support mechanism comprises a slidable plate mechanism.

13. A vehicle washing apparatus according to claim 11 wherein said movable support mechanism has stop means for said brush support arm mounted thereon, said stop means being positioned to permit said brush arm to pivot in an arc of approximately 180°.

14. A vehicle washing apparatus according to claim 11 which further includes a track mounted overhead on said frame and wherein said movable brush arm support mechanism is mounted on said track for movement thereon.

15. A vehicle washing apparatus according to claim 14 wherein said track comprises a rectangular bar.

16. A vehicle washing apparatus according to claim 14 wherein said track includes a first cylindrical rod and said movable brush arm support mechanism includes a linear bearing for mounting said movable brush arm support mechanism on said first cylindrical rod whereby said movable brush arm support mechanism is movable linearly along said first cylindrical rod and is rotatable on said first cylindrical rod in a plane perpendicular to said first cylindrical rod.

17. A vehicle washing apparatus according to claim 16 wherein said track further includes a second cylindrical rod spaced from said first cylindrical rod and said movable brush arm support mechanism includes a grooved roller adapted to ride on said second cylindrical rod.

18. A vehicle washing apparatus according to claim 11 which further includes control means connected between said frame and said movable brush arm brush arm support mechanism to control movement of said movable support mechanism.

19. A vehicle washing apparatus according to claim 18 wherein said control means comprises an air cylinder.

20. A vehicle washing apparatus according to claim 11 wherein said means rotatably mounting said brush includes flexible coupling means.

21. A vehicle washing apparatus according to claim 11, wherein the brush support arm of one brush assembly is longer than the brush support arm of the other assembly.

* * * * *